United States Patent [19]

Lopez

[11] Patent Number: 5,607,348
[45] Date of Patent: Mar. 4, 1997

[54] DISC BRAKE GRINDING APPARATUS AND METHOD

[76] Inventor: Francisco R. Lopez, 1165 E. 13th St., Upland, Calif. 91786

[21] Appl. No.: 482,947

[22] Filed: Jun. 7, 1995

[51] Int. Cl.[6] .................................................. B24B 23/00
[52] U.S. Cl. ........................ 451/194; 451/209; 451/210; 451/358; 451/902
[58] Field of Search .............................. 451/902, 63, 69, 451/194, 209, 210, 358

[56] References Cited

U.S. PATENT DOCUMENTS

| | | | |
|---|---|---|---|
| 3,610,098 | 10/1971 | Walker | 451/194 |
| 3,621,505 | 11/1971 | Vocker et al. | 451/194 |
| 4,262,452 | 4/1981 | Lopez . | |
| 4,336,730 | 6/1982 | Kopecko et al. | 451/902 |
| 4,417,422 | 11/1983 | Redeker et al. | 451/194 |

FOREIGN PATENT DOCUMENTS 326611  7/1983  Germany .................................. 451/902

Primary Examiner—Bruce M. Kisliuk
Assistant Examiner—George Nguyen
Attorney, Agent, or Firm—Denton L. Anderson; Sheldon & Mak, Inc.

[57] ABSTRACT

An apparatus for grinding a disc brake disc having opposite surfaces, the apparatus comprising: a free-standing support; a pair of rotors, at least one of which is a grinding rotor, the rotors attached to the support to extend in spaced relation at opposite sides of a disc for grinding at least one face of the disc, wherein at least one rotor is pivotally attached to the support and can be moved toward and away from the disc independent of the other rotors; adjustment means attached to the support to allow adjustment of the angle of at least one rotor in relation to a face of the disc; and drive means to rotate at least one of the rotors. A method of grinding a disc brake disc having opposite faces utilizing a pair of rotors at least one of which is a grinding rotor, wherein the rotors are pivotally mounted on a freestanding frame, the methods comprising the steps of: locating the rotors at opposite sides of the disc; engaging the rotors with the opposite faces of the disc by moving the rotors towards the faces of the disc; adjusting the angle of the rotors in relationship to the faces of the disc to achieve optimal contact with the rotors and the faces of the disc; and rotating the grinding rotor.

14 Claims, 4 Drawing Sheets

DISC BRAKE GRINDING APPARATUS AND METHOD

BACKGROUND

This invention relates generally to brakes, and in particular to cleaning or finish-treating the surfaces of disc brakes.

Disc brakes are commonly used in automotive and other applications due to their efficiency and braking power. However, deposits such as "glazing" can form on the surfaces of the disc brakes during friction braking at high temperatures or after prolonged use. Such deposits can reduce braking efficiency, and can lead to objectionable squeaking. As such, disc brakes require cleaning by lightly grinding their braking surfaces to remove the deposits.

In the past, apparatus for grinding disc brakes required the removal of the braking disc from the wheel supporting it in order to accomplish such cleaning. In the case of automobiles, the braking disc must be separated from the automobile, cleaned in a lathing machine, and then reattached to the vehicle. This process is time consuming and expensive.

U.S. Pat. No. 4,262,452 discloses a method and apparatus for overcoming the aforementioned problems and disadvantages by disclosing a method, and means for, grinding a disc brake disc by employing a pair of rotors. The disc is rotated while it is carried by its support and the rotors are located at opposite sides of the disc, engaging the rotors with the opposite sides of the disc while the rotors are rotated by a motor. Typically, both rotors are grinding rotors and are carried by a support frame, and the method includes releasable attaching or hooking that frame to a brake pad carrier frame prior to engaging the rotors with the opposite sides of the disc, whereby the rotors are accurately located relative to the disc.

However, the apparatus is not free-standing and the angle of the rotors with respect to the disc faces cannot be adjusted. The apparatus also requires the disc to be rotated by a drive means other than rotors. Further, the apparatus requires a spring to urge the rotors relatively toward one another and, an actuator to initially urge the rotors away from one another. In addition, the apparatus requires a control connected to the actuator and the motor to cause the actuator to allow the spring to displace the rotors relatively towards one another.

There is therefore need for a simple procedure and apparatus to clean disc brakes and preferably in a short period of time, where the apparatus is freestanding, does not require an independent drive means to rotate the disc, and allows adjustment of the angle of the rotors in relation to the disc.

SUMMARY

The present invention satisfies these needs. The present invention provides an apparatus for grinding a disc brake disc having opposite faces, the apparatus comprising: (a) a free-standing support; (b) a pair of rotors attached to the support; (c) adjustment means attached to the support to allow adjustment of the angle of at least one rotor in relation to a face of the disc; and (d) drive means to rotate at least one of the rotors. At least one of the rotors is a grinding rotor, and the rotors are attached to the support to extend in spaced relation at opposite sides of a disc for grinding at least one face of the disc, wherein at least one rotor is pivotally attached to the support and can be moved toward and away from the disc independent of the other rotor.

Preferably, both rotors are grinding rotors, and each rotor is frusto-conical with a slant height region generally parallel to the opposite faces of the disc. At least one rotor can be detached from the support for replacement with another rotor and both rotors can be pivotally attached to the support and can be moved toward and away from the disc independent of each other. The adjustment means can allow the adjustment of the angle of both rotors in relation to the faces of the disc, and in particular adjustment of the angle of the slant height region of the rotors in relationship to the faces of the disc. The adjustment means also allows adjustment of the angle of the axis of rotation the rotors in relation to the radius and center of the disc. The support can include a frame pivotally attached to the support, wherein at least one rotor can be pivotally attached to the frame to pivot relative to the frame.

The present invention also provides a method of grinding a disc brake disc having opposite faces utilizing a pair of rotors at least one of which is a grinding rotor, wherein the rotors are pivotally mounted on a free-standing frame. The method comprises the steps of: locating the rotors at opposite sides of a disc; engaging the rotors with the opposite faces of the disc by moving the rotors towards the faces of the discs; adjusting the angle of the rotors in relationship to the faces of the disc to achieve optimal contact between the rotors and the faces of the disc; and rotating the grinding rotor. Preferably, both rotors are grinding rotors and the step of rotating includes rotating both rotors.

As such, the method and apparatus of the present invention provides for cleaning of disc brake discs without detaching the discs from their supporting and also allows for adjusting the angle of the rotors with respect to the faces of the disc to achieve optimal contact with the rotors and the faces of the disc.

DRAWINGS

These and other features, aspects and advantages of the present invention will become understood with reference to the following description, appended claims and accompanying drawings where:

DESCRIPTION

Figure 1:
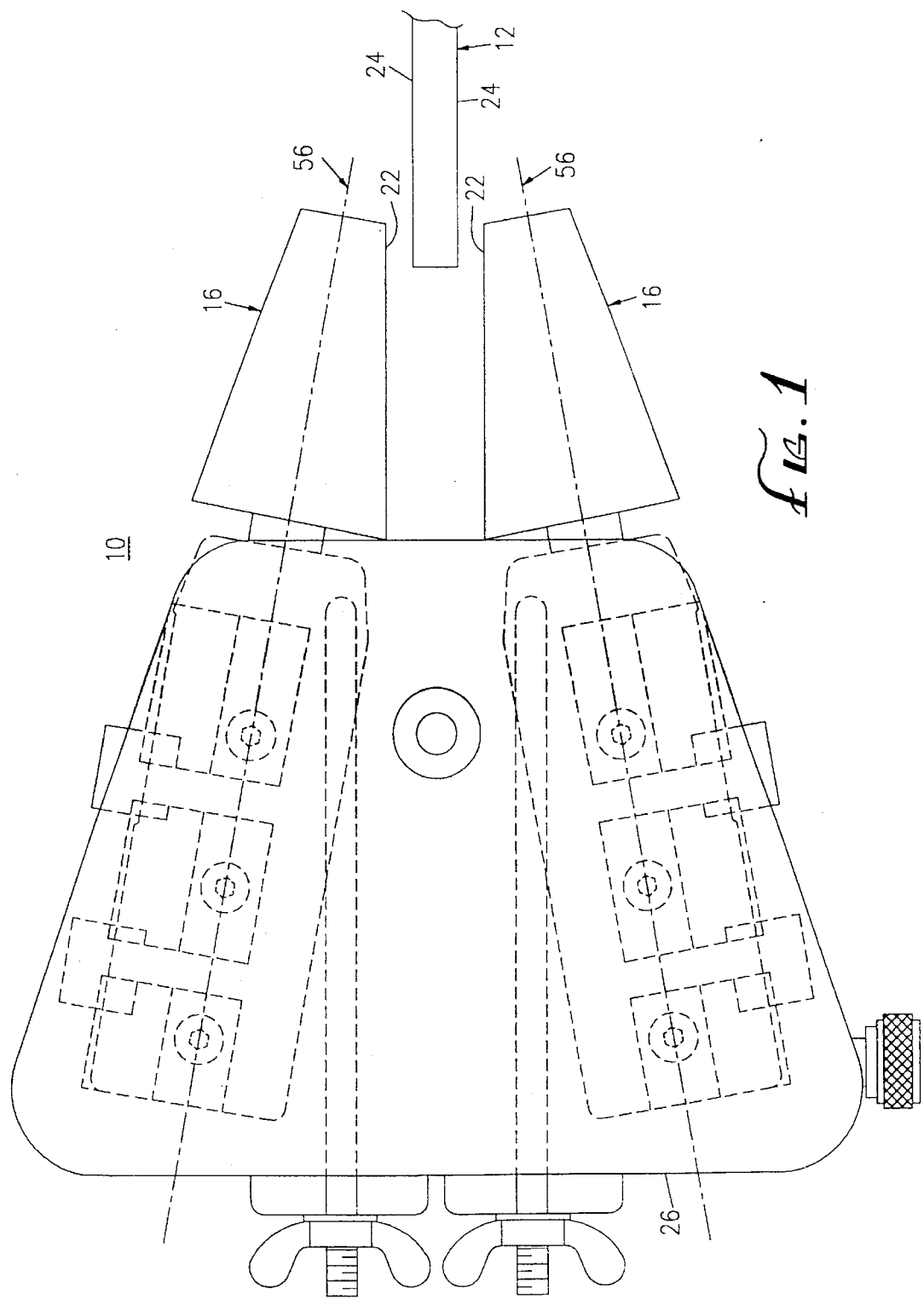
FIG. 1 is a top view of an apparatus for grinding a disc brake disc according to the present invention.

Referring to the drawings, an apparatus 10 for grinding a disc brake disc 12 having opposite faces 24 according to the present invention is disclosed. The apparatus 10 comprises a freestanding support 14; a pair of rotors 16 attached to the support 14; adjustment means 18 attached to the support 14 to allow adjustment of the angle of at least one rotor in relation to a face of the disc 12; and drive means 20 to rotate at least one of the rotors 16. At least one of the rotors 16 is a grinding rotor, and the rotors 16 are attached to the support 14 to extend in space relation at opposite sides of the disc 12 for grinding at least one face of the disc 12. Preferably at least one rotor is pivotally attached to the support 14 and can be moved toward and away from the disc 12 independent of the other rotor.

As shown in the drawings, preferably, each rotor is frusto-conical with a slant height region 22 generally parallel to the opposite faces 24 of the disc 12. Preferably, at least one rotor can be detached from the support 14 for replacement with another rotor. Both rotors 16 can be pivotally attached to the support 14 and can be moved toward and away from the disc 12 independent of each other. In the embodiment shown in the drawings, the support 14 further comprises a frame 26 pivotally attached to the support 14 and the rotors 16 are pivotally attached to the frame 26 to pivot relative to the frame 26.

Preferably, the adjustment means 18 allows independent adjustment of the angle of each rotor in relation to the faces of the disc 12. In particular, the adjustment means 18 allows adjustment of the angle of the slant height region 22 of the rotors 16 in relation to the face of the disc 12. In the embodiment shown in the drawings, the adjustment means 18 is attached to the frame 26. Preferably, the frame 26 is attached to the support 14 via pivot means 54 to allow adjustment of the vertical angle of the frame relative to the support 14, thereby allowing adjustment of the angle of the axis of rotation 56 the rotors 16 in relation to the radius 58 and center 60 of the disc 12 by pivoting the frame 26 up or down. In another embodiment of the invention, the pivotal attachment of each rotor to the frame allows independent change in the angle of axis of rotation 56 of each rotor relative to the radius 58 center 60 of the disc.

In the embodiment of the invention shown in the drawings, the grinding apparatus of the present invention is illustrated as an "grinding gun" including a pistol-grip handle 28 portion which projects generally downwardly from a forward extending portion 30 carrying the rotors 16. The rotors 16 have axis of rotation relative to the frame 26 which taper forwardly. The rotors 16 are advantageously carried on output shafts 32 of motors 20 as shown in the drawings. The rotors 16 can be manually detached and reattached to the output shafts 32, whereby each rotor can be replaced by another rotor as necessary.

Because the rotors 16 are pivotally attached to the frame 26, each rotor can be freely and independently moved toward and away from the disc 12 for engaging and disengaging a face of the disc 12. Further, because the frame 26 is pivotally attached to the support 14, the frame 26 can be rotated horizontally to adjust the angle of the rotors 16 relative to the disc 12. Advantageously, the adjustment means 18 allows further adjustment of the angle of the rotors 16 relative to the disc 12 to achieve optimal contact between the slant height region 22 of each rotor and the face of the disc 12.

In the embodiment shown in the drawings, the motors 20 are pneumatic motors driven by air pressure. The pistol-grip handles 28 include air ducts 34 for carrying air flow to the motors 20. Each pistol-grip handle 28 also includes a valve 36 and a trigger 38 for actuating the valve 36 to connect and disconnect flow of air to the motors 20 by a user.

The user can operate the "grinding gun" by, for example, grabbing the pistol-grip handles 28, moving them away from one another, moving the freestanding support 14 carrying the rotors 16 toward a disc 12 such that the rotors 16 are disposed at opposite sides of the disc 12. The user then moves the pistol-grip handles 28 towards one another to engage the rotors 16 against the faces of the disc 12. The user can then pivot the frame 26 and utilize the adjustment means 18 to achieve optimal contact between the slant height region 22 of the rotors 16 and the faces of the disc 12. The user then engages the trigger 38 to actuate flow of air to the motors 20 whereby the motors 20 drive the rotors 16 in opposite directions. The rotation of the rotors 16 causes the disc 12 to rotate along the axis of rotation of the disc 12 whereby the rotors 16 grind the faces of the disc 12. As such, the disc 12 need not be rotated by an independent motor.

Preferably, the motors 20 rotate the rotors 16 the direction that forces the pistol-grip handles 28 towards one another. The motors 20 can be electric motors or other means of rotating the rotors.

The present invention also provides a method for grinding a disc brake disc having opposite faces utilizing a pair of rotors at least one of which is a grinding rotor, wherein the rotors are pivotally mounted on a freestanding frame. The method comprises the steps of: locating the rotors at opposite sides of the disc; engaging the rotors with the opposite faces 24 of the disc by moving the rotors towards the faces of the disc; adjusting the angle of the rotor in relation to the faces of the disc to achieve optimal contact between the rotors and the faces of the disc; and rotating the grinding rotor.

Upon completion of grinding, the user releases the trigger 38 thereby cutting the flow of air to the motors 20 and stopping the rotors 16 and the disc 12 from rotating. The user then moves the pistol-grip handles 28 away from one another to disengage the rotors 16 from the faces of the disc 12 and moves the support 14 away from the disc 12. The grinding task is therefore accomplished without removing the disc 12 from the vehicle.

Because the support 14 is freestanding, it can be carried by rollers or suspended from the ceiling. In either case the freestanding support 14 allows the apparatus 10 to be easily stored as desired. Further, because the support 14 is freestanding, it need not be attached to the vehicle carrying the disc brake disc 12.

The forward portion 30 of each grinding gun is pivotally attached to the frame 26 via a pivot block 40 as shown in the drawings. The forward portion 30 is supported by hangers 42 on the frame 26.

Figure 2:
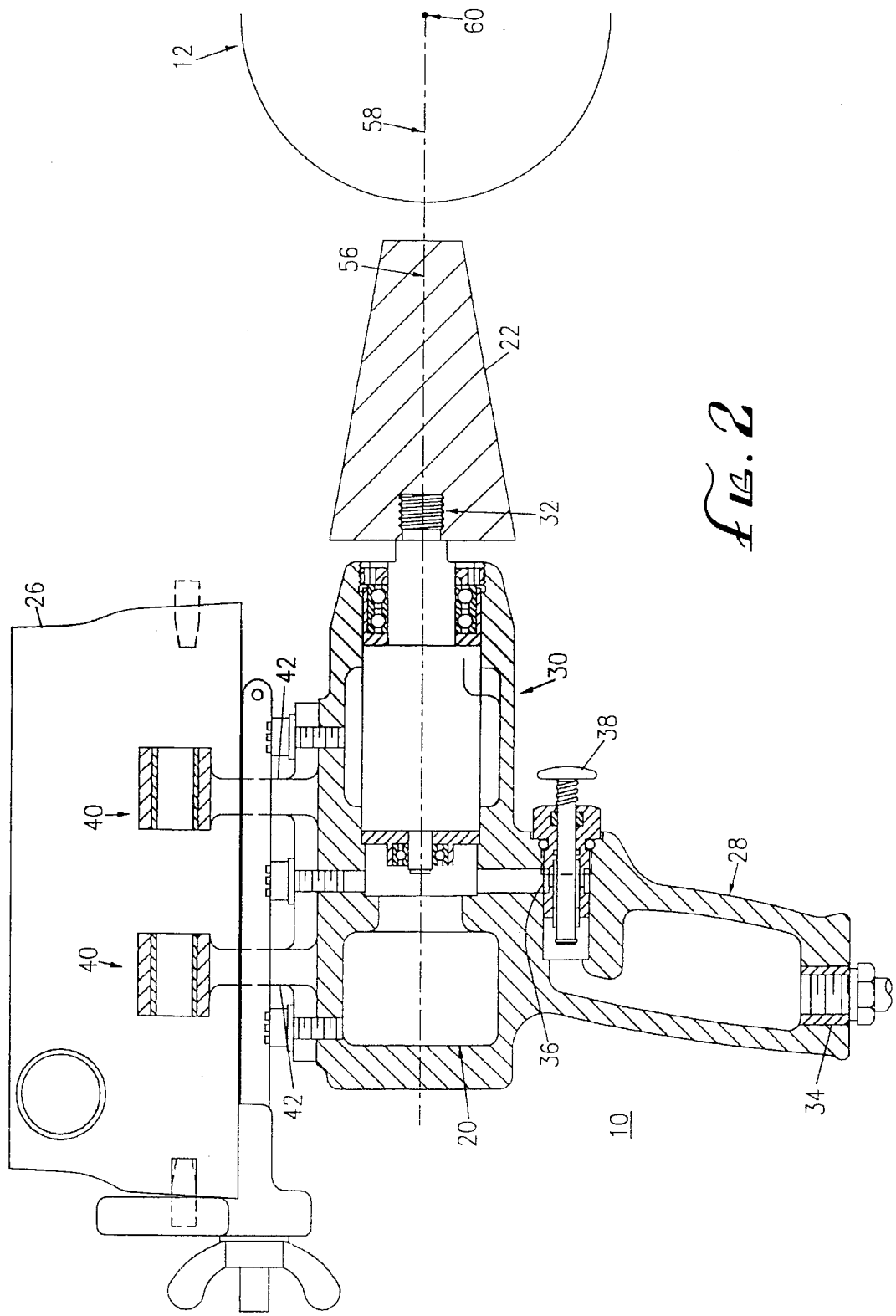
FIG. 2 is a side view of the apparatus of FIG. 1.
Figure 3:
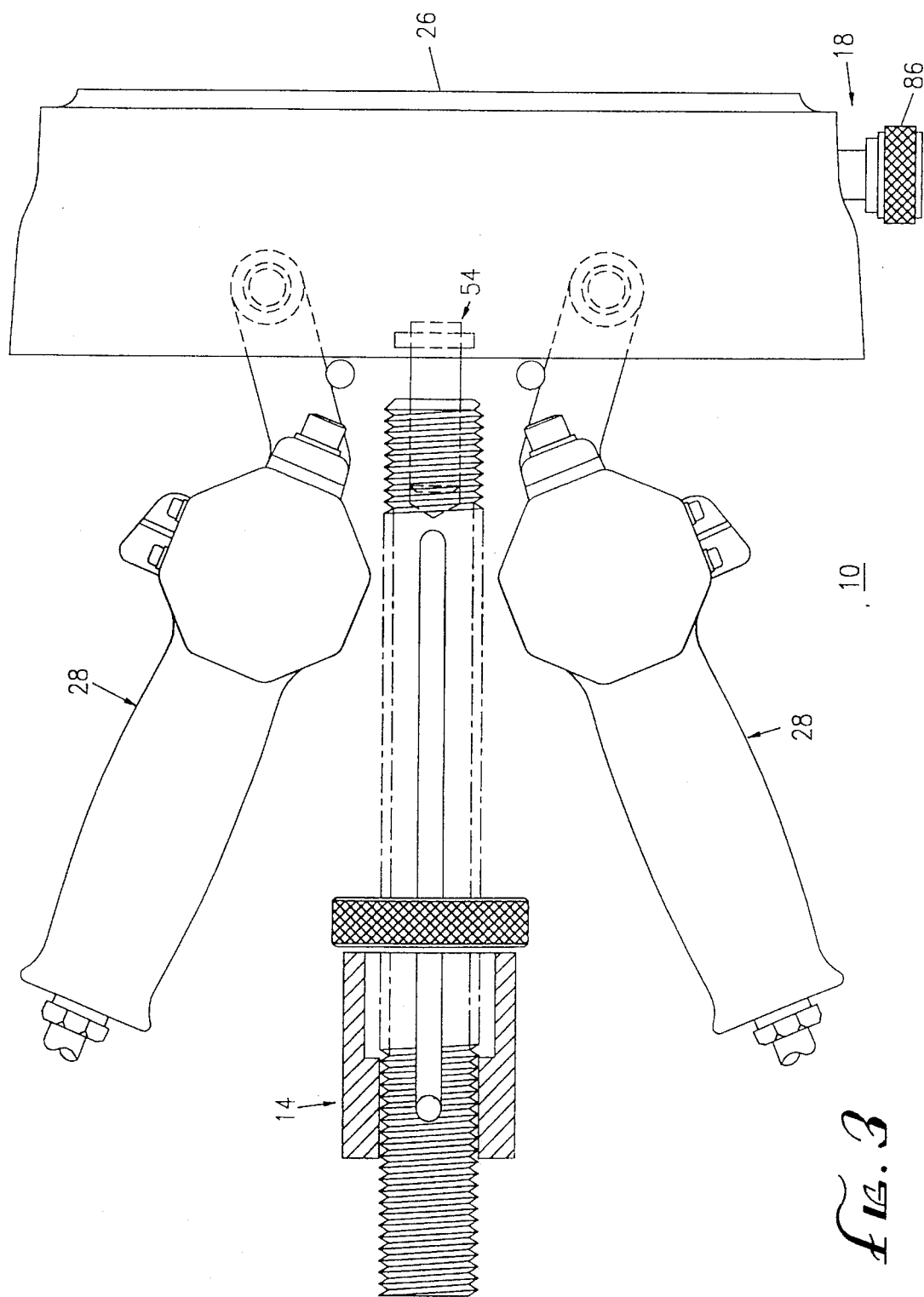
FIG. 3 is a rear view of the apparatus of FIG. 1.

In the embodiment shown in FIGS. 1–3, the adjustment means 18 for each rotor includes a screw 46 threadedly attached to the frame 26 wherein the screw 46 is threadedly in communication with the pivot blocks 40 of both grinding guns. Turning the screw 46 in opposite directions causes the pivot blocks 40 to turn in a horizontal plane, thereby turning the rotors 16 towards and away from each other, respectively, to adjust the angle of the slant height region 22 of the rotors 16 relative to the disc 12.

Figure 4:
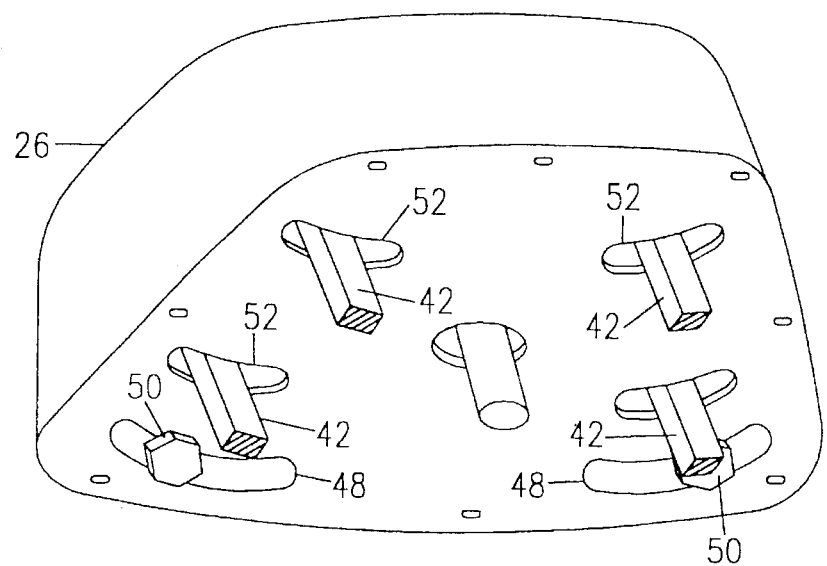
FIG. 4 is a perspective view of another embodiment of the frame of the apparatus of the present invention.
Figure 5:
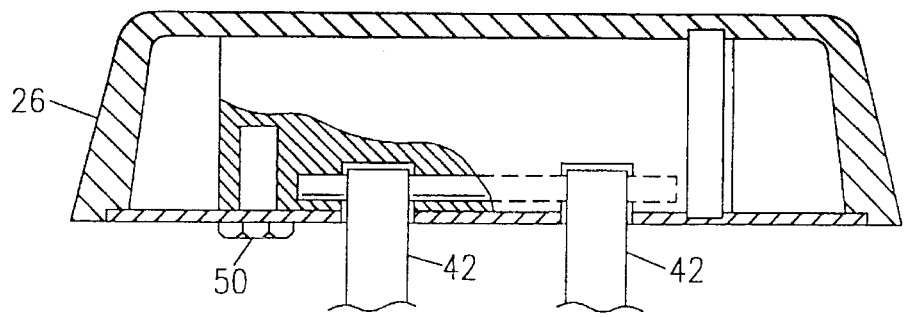
FIG. 5 is a side view of the frame of FIG. 4.
Figure 6:
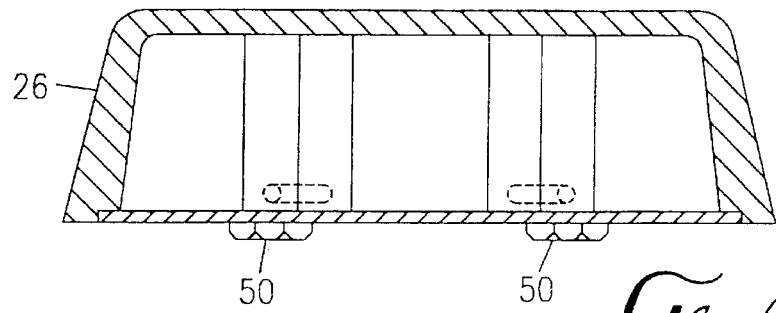
FIG. 6 is a rear view of the frame of FIG. 4.

Referring to FIGS. 4–6, another embodiment of the adjustment means 18 is shown. The grinding guns are suspended (not shown) from hangers 42 attached to pivot blocks 40 as discussed above. The hangers 42 are disposed in slots 52 formed in the body of the frame 26. Nuts 50 disposed in slots 48 formed in the frame 26 are in communication with the pivot blocks 40. The nuts 50 allow the angle of each forward portion 30, and therefore the corresponding rotor, to be adjusted in a horizontal plane independent of the other rotor. This is done by loosening each nut 50 as necessary, sliding the nut 50 in the slot 48, thereby sliding the pivot block 40 of the forward portion 30 to slide the hangers 42 in slots 52 to achieve a desired rotor angle relative to a disc face 24 and then fastening the nut 50. Those skilled in the art recognize that there are other equally feasible means of adjusting the angle of the rotors 16 in relation to the faces of the disc 12 for achieving optimal contact between the rotors 16 and the faces 24 of the disc 12.

Although the present invention has been described in considerable detail with reference to certain preferred versions thereof, other versions are possible. Therefore, the spirit and scope of the appended claims should not be limited to the description of the preferred versions contained herein.

What is claimed is:

1. An apparatus for grinding a disc brake disc having opposite faces, the apparatus comprising:
   (a) a freestanding support;
   (b) a pair of rotors, at least one of which is a grinding rotor, the rotors attached to the support to extend in spaced relation at opposite sides of a disc for grinding at least one face of the disc, wherein both rotors are pivotally attached to the support and can be moved toward and away from the disc independent of each other;
   (c) adjustment means attached to the support to allow adjustment of the angle of at least one rotor in relation to a face of the disc; and
   (d) drive means to rotate at least one of the rotors.

2. The apparatus of claim 1 wherein each rotor is frusto-conical with a slant height region generally parallel to the opposite faces of the disc.

3. The apparatus of claim 1 wherein at least one rotor can be detached from the support for replacement with another rotor.

4. The apparatus of claim 1 wherein the adjustment means allows adjustment of the angle of both rotors in relation to the faces of the disc.

5. The apparatus of claim 4 wherein the adjustment means allows adjustment of the angle of the slant height region of the rotors in relation to the faces of the disc.

6. The apparatus of claim 4 wherein the adjustment means allows adjustment of the angle of each rotor in relation to the faces of the disc independent of the other rotor.

7. The apparatus of claim 1 wherein the support includes a frame pivotally attached to the support and wherein both rotors are pivotally attached to the frame to pivot relative to the frame.

8. The apparatus of claim 7 wherein the adjustment means is attached to the frame.

9. The apparatus of claim 1 wherein the drive means includes pneumatic motor means to rotate both rotors.

10. The apparatus of claim 1 wherein both rotors are grinding rotors.

11. An apparatus for grinding a disc brake disc having opposite faces, the apparatus comprising:
    (a) a freestanding support;
    (b) a pair of frusto-conical rotors with slant height regions, at least one of which is a grinding rotor, the rotors pivotally attached to the support to extend in spaced relation at opposite sides of a disc for grinding at least one face of the disc, the slant height region of the rotors being generally parallel to the opposite faces of the disc, wherein the rotors can be moved toward and away from the disc independent of the other rotor;
    (c) adjustment means attached to the support to allow adjustment of the angle of the slant height region of the rotors in relation to the faces of the disc; and
    (d) drive means to rotate at least one of the rotors.

12. The apparats of claim 11 wherein at least one rotor can be detached from the support for replacement with another rotor.

13. The apparatus of claim 12 wherein the support includes a frame pivotally attached to the support and wherein the rotors are pivotally attached to the frame to pivot relative to the frame.

14. The apparatus of claim 11 wherein both rotors are grinding rotors.

* * * * *